United States Patent
Tozuka et al.

(10) Patent No.: US 7,046,381 B2
(45) Date of Patent: May 16, 2006

(54) IMAGE FORMING APPARATUS

(75) Inventors: Kouichi Tozuka, Kanagawa (JP); Hiroshi Fujimoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 952 days.

(21) Appl. No.: 10/071,181

(22) Filed: Feb. 11, 2002

(65) Prior Publication Data

US 2002/0113997 A1    Aug. 22, 2002

(30) Foreign Application Priority Data

Feb. 16, 2001 (JP) ............... 2001-040543

(51) Int. Cl.
*G06F 3/12*    (2006.01)

(52) U.S. Cl. ............ 358/1.13; 358/446; 382/164; 427/201

(58) Field of Classification Search .............. None
See application file for complete search history.

(56) References Cited

U.S. PATENT DOCUMENTS 4,860,115 A * 8/1989 Ogura .................. 358/443
5,134,667 A * 7/1992 Suzuki ................. 382/164
5,756,151 A * 5/1998 Koide et al. ........... 427/201

FOREIGN PATENT DOCUMENTS

| JP | 5-216322 | 8/1993 |
| JP | 7-30752 | 1/1995 |
| JP | 7-301939 | 11/1995 |

* cited by examiner

*Primary Examiner*—Mark Zimmerman
*Assistant Examiner*—Mario Ayele
(74) *Attorney, Agent, or Firm*—Sughrue Mion, PLLC

(57) ABSTRACT

An image forming apparatus in which an image is formed on paper without it being necessary for the user to identify and select paper having a suitable texture. Input image data is expanded to bit map data, and it is determined as to whether at least 30% of the expanded bit map data is a character image data region. When this determination is affirmative, a tray is selected, wherein paper having a glossiness such that its 45° reflectance is at most 20% is accommodated. If the determination is negative, that is, when at least 70% of the expanded bit map data is neither a character image data region nor a blank data region, a tray is selected, wherein paper having a glossiness such that its 45° reflectance is at least 50%, is accommodated. An image is then printed on the selected paper.

21 Claims, 2 Drawing Sheets

IMAGE FORMING APPARATUS

BACKGROUND OF THE INVENTION

1. Field of the Invention

The present invention relates to an image forming apparatus, and particularly to a color image forming apparatus such as an electrophotographic color printer in which an image can be formed on glossy paper having photographic texture.

2. Description of the Related Art

An electrophotographic system which used to be limited to the field of documentation, is being utilized in the field of photography also, due to color printing or realization of high image quality in an electrophotographic printer, and development of glossy paper having photographic texture, and thus the number of kinds of paper texture has also increased.

In the electrophotographic system, glossy paper is suitable for printing of image data having many photographic images. In printing of image data having many characters, paper having a little glossiness and a low reflectance is suitable for distinguishing closely printed characters.

However, although printers have conventionally existed wherein paper size is automatically selected, automatic selection of paper corresponding to the glossiness of the paper is not yet being performed. For this reason, a user needs to identify the kind of glossy paper which is suitable for the image data, and select or feed the selected paper by a manual operation. As a result, a user is troubled with performing the above-described operation and a printing operation is made complicated.

SUMMARY OF THE INVENTION

The present invention has been achieved so as to solve the above-described problem, and an object thereof is to provide an image forming apparatus in which appropriate paper can be automatically selected without the user identifying paper having a suitable texture, and an image can be formed on the selected paper.

In order to achieve the above-described object, according to the present invention, there is provided an image forming apparatus for use with different kinds of paper, the image forming apparatus comprising: a plurality of trays in which the different kinds of paper can be respectively accommodated; a data input component for inputting image data; a determining component for determining what percentage of the inputted image data which has been expanded by bit mapping corresponds to character image data; a selection component for selecting predetermined paper in accordance with the percentage corresponding to character image data determined by the determination component; and an image forming component for forming an image on the paper selected by the selection component.

The different kinds of paper have different reflectances from one another, and when it is determined by the determination component that the percentage corresponding to character image data is at least a predetermined value, the selection component may be provided so as to select paper whose reflectance is no more than a predetermined value. Further, when it is determined by the determination component that the percentage corresponding to character image data is no more than a predetermined value, the selection component may be provided so as to select paper whose reflectance is at least a predetermined value.

A first aspect of the present invention is an image forming apparatus for use with different types of paper, which includes paper whose 45° reflectance is at most 20%, the image forming apparatus comprising: a plurality of trays in which the different kinds of paper can be respectively accommodated; a data input component for inputting image data; a determining component for making a determination as to whether at least 30% of the inputted image data which has been expanded by bit mapping corresponds to character image data; a selection component which, when it is determined by the determining component that at least 30% of the expanded data corresponds to character image data, selects paper whose 45° reflectance is at most 20%; and an image forming component for forming an image on the paper selected by the selection component.

According to the first aspect of the present invention, it is determined by the determination component as to whether at least 30% of the inputted image data which has been expanded by bit mapping, corresponds to a character image data region. If it is determined that at least 30% of the expanded data corresponds to the character image data region, paper having a 45° reflectance of 20% or less, is selected by the selection component. An image is then formed on the selected paper.

A second aspect of the present invention is an image forming apparatus for use with different types of paper, which includes paper whose 45° reflectance is at least 50%, the image forming apparatus comprising: a plurality of trays in which the different kinds of paper can be respectively accommodated; a data input component for inputting image data; a determining component for making a determination as to whether at least 70% of the inputted image data which has been expanded by bit mapping, corresponds to photographic image data; a selection component which, when it is determined by the determination component that at least 70% of the expanded data corresponds to photographic image data selects paper whose 45° reflectance is at least 50%; and an image forming component for forming an image on the paper selected by the selection component.

According to the second aspect of the present invention, it is determined by the determination component as to whether at least 70% of the inputted image data which has been expanded by bit mapping, corresponds to one of the character image data region and the blank data region, or to neither. If it is determined that at least 70% of the expanded data corresponds to neither the character image data region nor the blank data region, paper having a 45° reflectance of 50% or more, is selected by the selection component. An image is then formed on the selected paper.

As described above, according to the present invention, glossy paper most suitable for image data is automatically selected. Therefore, glossy paper suitable for image data is automatically selected without it being necessary for the user to select paper having suitable texture, and an image is formed on the selected paper.

As the paper of the present invention, image receiving paper for electrophotography can be used. A support of the image receiving paper for electrophotography is not particularly limited so long as it is heat resistant at a fixing temperature and satisfy requirements in respects of smoothness, degree of whiteness, sliding property, degree of friction, antistatic property, absence of depressed portions after fixing, and the like. Specifically, synthetic paper (polyolefin based or polystyrene based synthetic paper), fine-quality paper, art paper, (two-side) coated paper, (two-side) cast-coated paper and the like are used.

A toner image receiving layer is more preferably provided. The toner image receiving layer is comprised of an image receiving material which receives a toner for forming an image by a development drum or an intermediate transfer body due to static electricity, pressure or the like at least in a transfer process and can be solidified due to heat, pressure or the like in a fixing process.

Examples of the above-described image receiving material include thermoplastic resin, water-soluble resin, fine-grained pigment and the like. The thickness of the image receiving layer is preferably at least a dimension which is half the grain diameter of the toner, and more preferably one to three times of the grain diameter of the toner. Further, the image receiving layer preferably has a thickness described in JP-A Nos. 5-216322 and 7-301939.

The thermoplastic resin is not particularly limited so long as it deforms at a fixing temperature and is capable of receiving a toner. Preferably, resin of the same group as the resin used as a binder of toner is used. The toner contains polyester resin, styrene resin or a copolymer resin such as styrene-butylacrylate in most cases. Therefore, as the thermoplastic resin used in the image receiving paper for electrophotography of the present invention as well, polyester resin, styrene resin and a copolymer resin such as styrene-butylacrylate are preferable.

More preferably, in addition to the image receiving layer, a surface protective layer, an intermediate layer, an undercoat layer, a cushioning layer, a charge control (antistatic) layer, a reflective layer, a color tint adjustment layer, a storability improving layer, an adhesion preventing layer, and an anti-curling layer, a smoothing layer or the like can be provided. Further, these layers each may be formed from two or more layers.

According to the present invention, there is also provided a system for selecting a type of paper for printing an image thereon, the system comprising a data processing arrangement including an input for receiving data for printing an image in accordance therewith on paper, the data processing arrangement comprising program logic that performs tasks including: (a) producing bitmap data in accordance with data received via the input; (b) determining what percentage of the bitmap data corresponds to character data; and (c) selecting a type of paper for printing based on what percentage of the bitmap data corresponds to character data.

In the above-described system, the selecting a type of paper may select between at least two types of papers with one type including a reflectance less than that of the other type, and if the percentage of bitmap data corresponding to character data at least equals a predetermined amount, the type of paper having a lesser reflectance is selected.

Further, the predetermined amount is 30%.

If more than 70% of the bitmap data corresponds to photographic data, the type of paper having a greater reflectance is selected.

Moreover, the character data includes data from the bitmap data that corresponds to blank print areas.

In the above-described system, the selecting a type of paper may select between at least two types of papers with one type including a reflectance less than that of the other type, and if the percentage of bitmap data corresponding to character data at least equals a predetermined amount, the type of paper having a lesser reflectance is selected.

If more than 70% of the bitmap data corresponds to photographic data, the type of paper having a greater reflectance is selected.

In accordance with the present invention, there is also provided a method for selecting a type of paper for printing an image thereon, the method comprising: (a) receiving data for printing an image in accordance therewith on paper; (b) producing bitmap data in accordance with the data received; (c) determining what percentage of the bitmap data corresponds to a predetermined kind of data; and (d) selecting a type of paper for printing based on what percentage of the bitmap data corresponds to the predetermined kind of data.

In the above-described method, the selecting a type of paper is made between at least two types of paper that have different reflectances from one another, and if more than 70% of the bitmap data corresponds to photographic data, the type of paper having the greater reflectance is selected.

Further, the greater reflectance may comprise a 45° reflectance of at least 50%.

Moreover, the predetermined kind of data may correspond to character data.

The character data may include data from the bitmap data that corresponds to blank print areas.

Still further, the selecting a type of paper is made between at least two types of paper that have different reflectances from one another, and if the percentage of the bit map data corresponding to character data is at least 30%, the type of paper having the lesser reflectance is selected.

DESCRIPTION OF THE PREFERRED EMBODIMENTS

Figure 1:
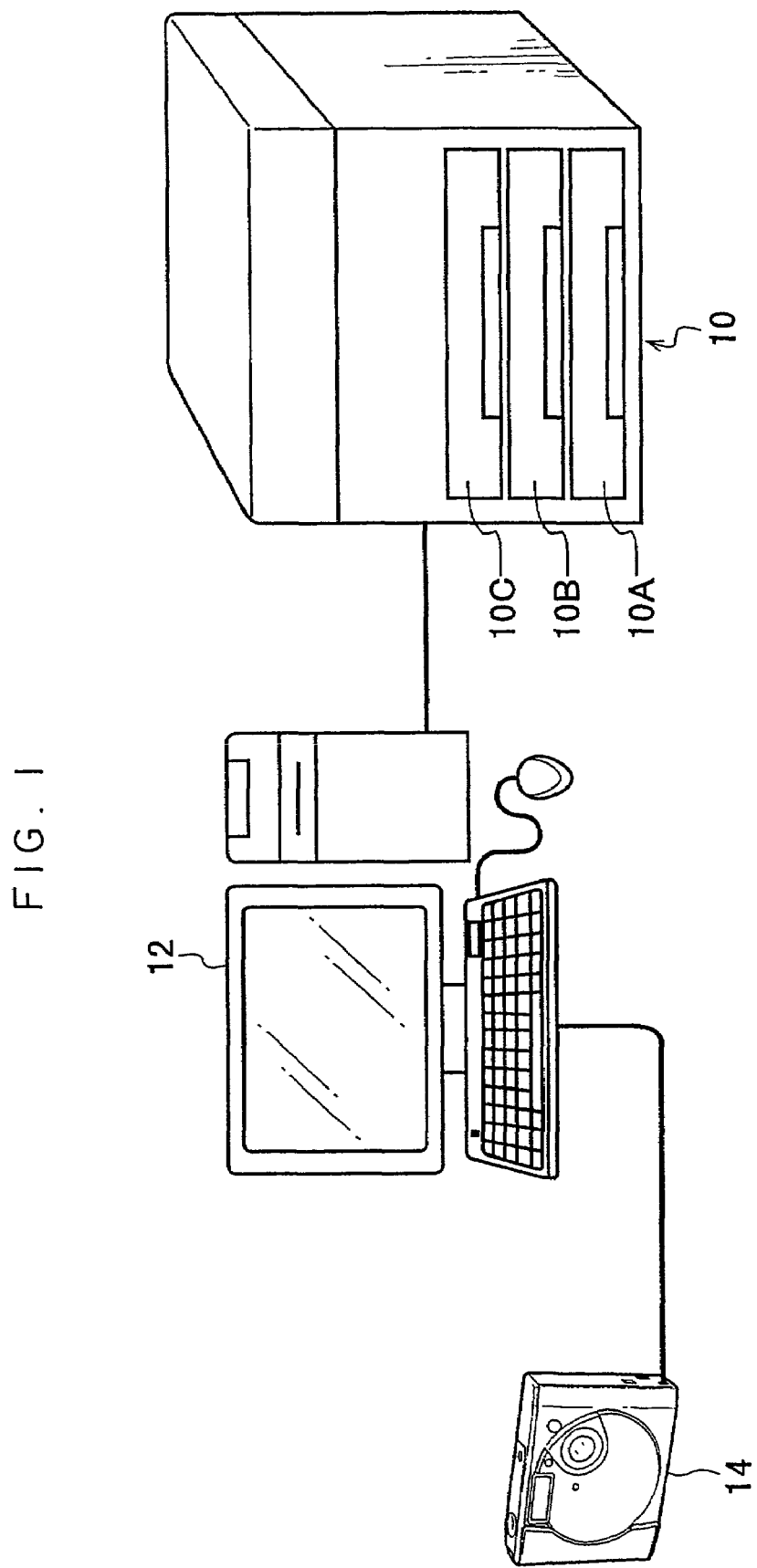
FIG. 1 is a block diagram showing an image forming system according to an embodiment of the present invention.

Referring now to the attached drawings, an embodiment of the present invention will be hereinafter described in detail. As shown in FIG. 1, an image forming system equipped with an image forming apparatus according to the present embodiment is comprised of a color printer 10 having a copy function as a component of the image forming apparatus, a personal computer 12 which transmits, via a cable such as a USB cable to the color printer 10, image data such as photographic image data, character image data, or mixed image data having photographic image data and character image data mixed with each other, and a digital camera 14 which transfers photographic image data via a cable such as a USB cable to the personal computer 12.

The color printer 10 has a plurality of trays 10A, 10B and 10C in which different kinds of paper are respectively accommodated, and an image reading device equipped with a platen glass and formed by CCD or the like for reading an image from an original placed on the platen glass. Paper such as plain paper having a 45° reflectance of 20% or less, and paper such as glossy paper having a 45° reflectance of 50% or more are respectively accommodated in the trays. The reflectance mentioned herein is a value specified by JISZ8741 (JIS: Japanese Industrial Standard).

Further, the color printer 10 includes a page buffer in which image data of one page transmitted from the personal computer 12, or image data of one page read by the image reading device is taken in and temporarily stored, and an expanding section in which image data stored in the page buffer is expanded to bit map data. The color printer 10 also includes an image forming section in which a light source for applying laser light, a polygon mirror and a photoconductive drum are provided and in which an image is formed by an electrophotographic system on supplied paper. The printer 10 further includes a control circuit formed of a microcomputer for controlling the expansion section, the image forming section and the like.

The digital camera 14 transmits photographic image data to the personal computer 12. In the personal computer 12, document image data prepared by the personal computer, or the like can be combined with the photographic image data transmitted from the digital camera 14.

Photographic image data recorded on, in place of the digital camera, a recording medium such as smart media, memory stick, compact flash, or CD-ROM may also be inputted to the personal computer, or mixed image data prepared by other personal computer or the like may also be inputted.

The document image data prepared by the personal computer using a word-processor software or prepared by another personal computer may be recorded on a recording medium such as a floppy disk or CD-R/RW and inputted to the personal computer.

Figure 2:
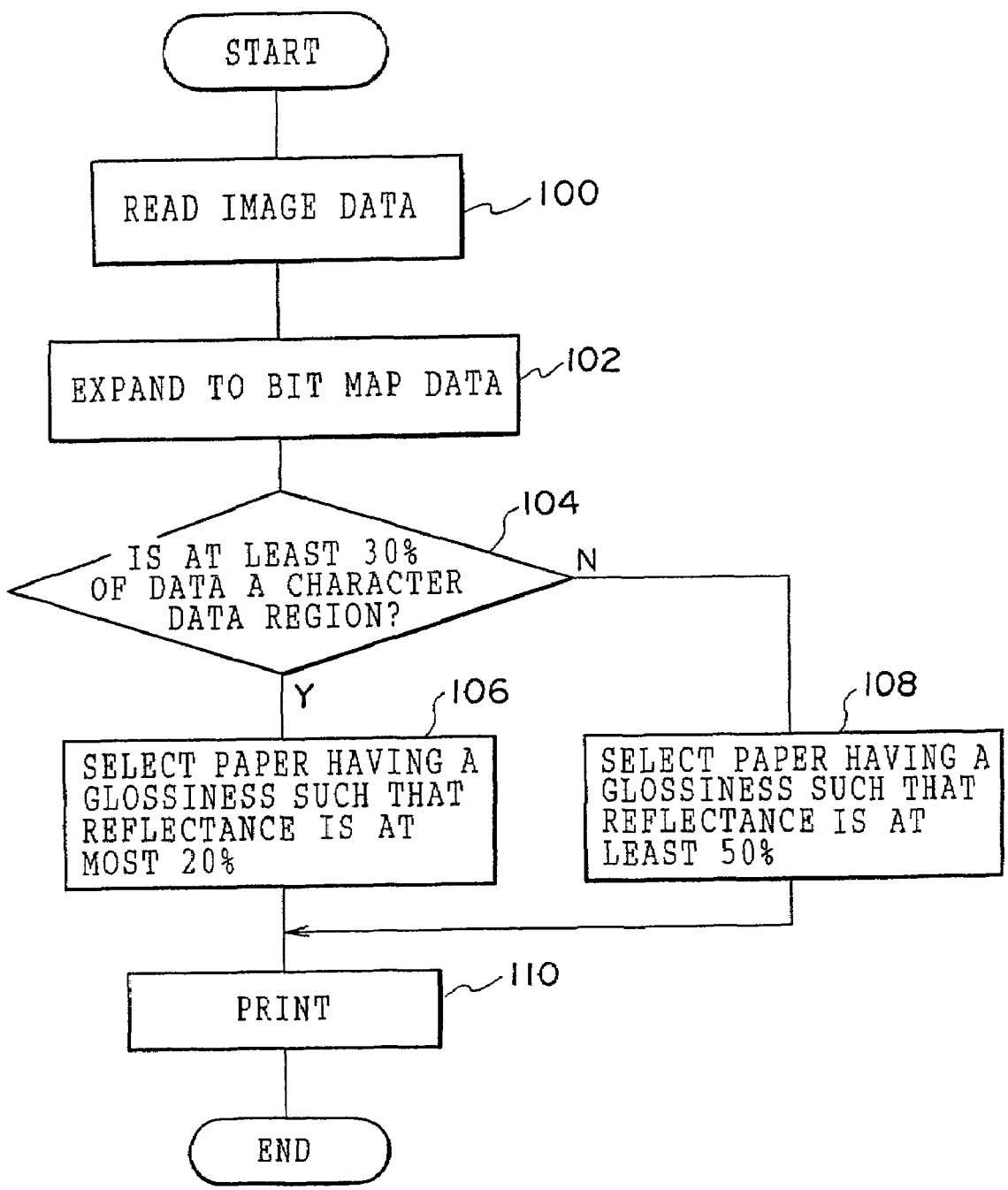
FIG. 2 is a flow diagram showing a paper-selection/printing processing routine according to the embodiment of the present invention.

Next, a description will be given of paper selection and printing processing executed by the control circuit of the color printer with reference to FIG. 2.

In step 100, image data transmitted from the personal computer is read and temporarily stored in the buffer. In step 102, the read image data is expanded to bit map data. In step 104, it is determined as to whether at least 30% of the expanded bit map data is character image data. If the determination of step 104 is affirmative, in step 106, a tray is selected, in which a stack of paper having glossiness such that the 45° reflectance is 20% or less, is accommodated, and paper is controlled so as to be fed from the selected tray. In this case, the determination as to whether at least 30% of the bit map data is character image data, is made because paper having glossiness such that the 45° reflectance is 20% or less is suitable for image data having the above-described range.

Thereafter, paper is fed to the image forming section by a conveying component (not shown) and an image is printed thereon based on the expanded bit map data.

On the other hand, if the determination of step 104 is negative, that is, if at least 70% of the expanded bit map data is neither character image data nor blank data (that is, at least 70% of the expanded bit map data is photographic image data), in step 108, a tray is selected, in which a stack of paper having glossiness such that the 45° reflectance is 50% or more, is accommodated, and paper is controlled so as to be fed from the selected tray. In this case, the determination as to whether at least 70% of the bit map data is neither character image data nor blank data is made because paper having glossiness such that the 45° reflectance is 50% or more is suitable for image data having the above-described range.

In order that a region of character image data and a region of photographic image data are distinguished from each other, for example, as described in JP-A No. 7-030752, an average density is calculated for each of blocks into which an entire image is divided, and density differences between adjacent blocks are compared with a preset threshold value.

Thereafter, paper is fed to the image forming section and an image is printed thereon based on the expanded bit map data.

As a result, when data of one page is image data having many character image data, paper such as plain paper whose glossiness is a predetermined value or less, is automatically selected and an image is printed thereon. When data of one page is image data having much photographic image data, glossy paper whose glossiness is a predetermined value or more is automatically selected and an image is printed thereon.

As described above, according to the present invention, glossy paper most suitable for image data is automatically selected. Accordingly, the present invention has an effect in that glossy paper suitable for image data can be automatically selected without the user identifying and selecting paper having suitable texture, and an image can be formed on the selected paper.

What is claimed is:

1. An image forming apparatus for use with different kinds of paper, the image forming apparatus comprising:
   a plurality of trays in which the different kinds of paper can be respectively accommodated;
   a data input component for inputting image data;
   a determining component for determining what percentage of the inputted image data which has been expanded by bit mapping corresponds to character image data;
   a selection component for selecting predetermined paper in accordance with the percentage corresponding to character image data determined by said determination component; and
   an image forming component for forming an image on the paper selected by said selection component.

2. The apparatus of claim 1, wherein the different kinds of paper have different reflectances from one another, and when it is determined by said determination component that the percentage corresponding to character image data is at least a predetermined value, said selection component is provided so as to select paper whose reflectance is no more than a predetermined value.

3. The apparatus of claim 1, wherein the different kinds of paper include paper whose 45° reflectance is no more than 20%, and when it is determined by said determination component that the percentage corresponding to character image data is at least 30%, said selection component selects paper whose 45° reflectance is no more than 20%.

4. The apparatus of claim 1, wherein the different kinds of paper have different reflectances from one another, and when it is determined by said determination component that the percentage corresponding to character image data is no more than a predetermined value, said selection component is provided so as to select paper whose reflectance is at least a predetermined value.

5. The apparatus of claim 1, wherein the different kinds of paper include paper whose 45° reflectance is at least 50%, and when it is determined by said determination component that the percentage corresponding to the character image data region is at most 30%, said selection component selects the paper whose 45° reflectance is at least 50%.

6. The apparatus of claim 1, wherein the character image data includes character image data and blank image data.

7. An image forming apparatus for use with different types of paper, which includes paper whose 45° reflectance is at most 20%, the image forming apparatus comprising:
   a plurality of trays in which the different kinds of paper can be respectively accommodated;
   a data input component for inputting image data;
   a determining component for making a determination as to whether at least 30% of the inputted image data which has been expanded by bit mapping corresponds to character image data;
   a selection component which, when it is determined by said determining component that at least 30% of the expanded data corresponds to character image data, selects paper whose 45° reflectance is at most 20%; and
   an image forming component for forming an image on the paper selected by said selection component.

8. An image forming apparatus for use with different types of paper, which includes paper whose 45° reflectance is at least 50%, the image forming apparatus comprising:
- a plurality of trays in which the different kinds of paper can be respectively accommodated;
- a data input component for inputting image data;
- a determining component for making a determination as to whether at least 70% of the inputted image data which has been expanded by bit mapping, corresponds to photographic image data;
- a selection component which, when it is determined by said determination component that at least 70% of the expanded data corresponds to photographic image data selects paper whose 45° reflectance is at least 50%; and
- an image forming component for forming an image on the paper selected by said selection component.

9. A system for selecting a type of paper for printing an image thereon, the system comprising a data processing arrangement including an input for receiving data for printing an image in accordance therewith on paper, the data processing arrangement comprising program logic that performs tasks including:
- (a) producing bitmap data in accordance with data received via the input;
- (b) determining what percentage of the bitmap data corresponds to character data; and
- (c) selecting a type of paper for printing based on what percentage of the bitmap data corresponds to character data.

10. The system of claim 9, wherein said selecting a type of paper selects between at least two types of papers with one type including a reflectance less than that of the other type, and if the percentage of bitmap data corresponding to character data at least equals a predetermined amount, the type of paper having a lesser reflectance is selected.

11. The system of claim 10, wherein the predetermined amount is 30%.

12. The system of claim 10, wherein if more than 70% of the bitmap data corresponds to photographic data, the type of paper having a greater reflectance is selected.

13. The system of claim 9, wherein the character data includes data from the bitmap data that corresponds to blank print areas.

14. The system of claim 13, wherein said selecting a type of paper selects between at least two types of papers with one type including a reflectance less than that of the other type, and if the percentage of bitmap data corresponding to character data at least equals a predetermined amount, the type of paper having a lesser reflectance is selected.

15. The system of claim 14, wherein if more than 70% of the bitmap data corresponds to photographic data, the type of paper having a greater reflectance is selected.

16. A method for selecting a type of paper for printing an image thereon, the method comprising:
- (a) receiving data for printing an image in accordance therewith on paper;
- (b) producing bitmap data in accordance with the data received;
- (c) determining what percentage of the bitmap data corresponds to a predetermined kind of data; and
- (d) selecting a type of paper for printing based on what percentage of the bitmap data corresponds to the predetermined kind of data.

17. The method of claim 16, wherein said selecting a type of paper is made between at least two types of paper that have different reflectances from one another, and if more than 70% of the bitmap data corresponds to photographic data, the type of paper having the greater reflectance is selected.

18. The method of claim 16, wherein said greater reflectance comprises a 45° reflectance of at least 50%.

19. The method of claim 16, wherein said predetermined kind of data corresponds to character data.

20. The method of claim 19, wherein said character data includes data from the bitmap data that corresponds to blank print areas.

21. The method of claim 20, wherein said selecting a type of paper is made between at least two types of paper that have different reflectances from one another, and if the percentage of the bit map data corresponding to character data is at least 30%, the type of paper having the lesser reflectance is selected.

* * * * *